I. F. NICHOLS.
LOCKING NUT.
APPLICATION FILED SEPT. 14, 1910.
988,375.
Patented Apr. 4, 1911.
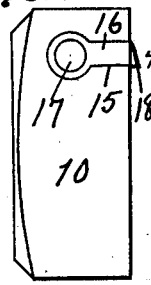
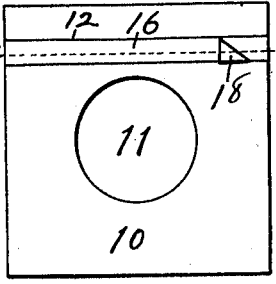
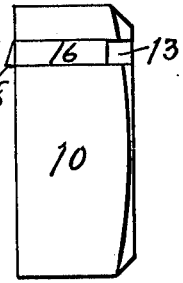
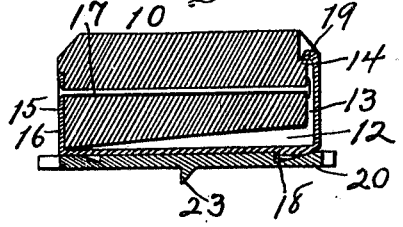
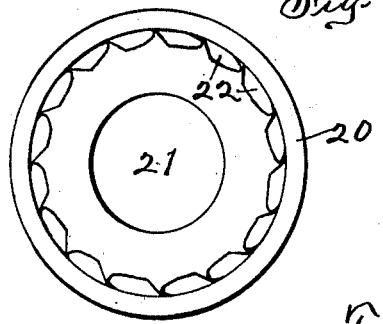
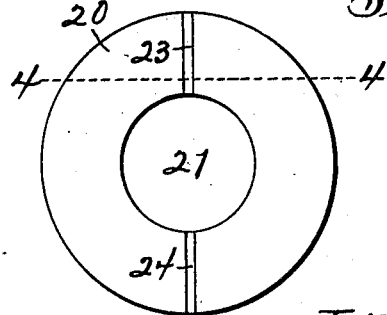
Attest:
F. D. Thompson
Earl M. Sinclair
Inventor:
Isaac Franklin Nichols.
By J. C. Swett Atty

UNITED STATES PATENT OFFICE.

ISAAC FRANKLIN NICHOLS, OF DES MOINES, IOWA.

LOCKING-NUT.

988,375.  Specification of Letters Patent.  Patented Apr. 4, 1911.

Application filed September 14, 1910. Serial No. 582,415.

*To all whom it may concern:*

Be it known that I, ISAAC FRANKLIN NICHOLS, citizen of the United States of America, and resident of Des Moines, Polk county, Iowa, have invented a new and useful Locking-Nut, of which the following is a specification.

The object of this invention is to provide an improved construction for locking nuts. A further object of this invention is to provide an improved construction for locking nuts and also for locking washers adapted to be employed conjunctively with said nuts.

My invention consists in the construction, arrangement and combination of elements hereinafter set forth, pointed out in my claims and illustrated by the accompanying drawing, in which—

Figure 1 is a side elevation of the nut. Fig. 2 is an end elevation of the same. Fig. 3 is a side elevation opposite to Fig. 1. Fig. 4 is a cross-section on the indicated lines 4—4 of Figs. 2 and 6. Fig. 5 is a face view of a washer and Fig. 6 is an opposite face view of said washer.

In the construction of the device as shown the numeral 10 designates a nut which is formed with a central threaded bore 11 and a groove 12 in and extending across one end transversely of and laterally removed from said bore. The bottom of the groove 12 is inclined and connects at its deeper end with a groove 13 extending across one face of the nut and provided with a shoulder 14. The shallower end of the groove 12 connects with a groove 15 extending partially across the face of the nut 10 opposite to the groove 13. A locking spring 16 is mounted in the grooves 12, 13 and 15. One end portion of the locking spring 16 is embedded in the groove 15 and is secured therein by a rivet 17 extending through the nut. The head of the rivet 17 is countersunk relative to the groove 13 and the opposite end of said rivet is upset on the end portion of the spring 16. The body of the spring 16 extends longitudinally of and through the groove 12 and is formed with a lug 18 projecting outwardly therefrom. Normally the lug 18 projects beyond the adjacent end face of the nut 10 while the body of the spring has its outer face flush with said end face; but owing to the inclined bottom of the groove 12, the locking spring can be depressed into said groove so that said lug does not project beyond said end face. The opposite and free end portion of the spring 16 is located in and extends through the groove 13 and is formed with a hook 19 on its extremity, which hook is adapted to engage the shoulder 14 and limit outward movement of said spring. The extremity of the hook 19 is beveled on its outer edge so that a tool may be introduced for the purpose of springing the extremity of said spring outward when desired. A washer 20 is provided and said washer is formed with the usual central bore 21 adapted to register with the bore 11 of the nut. The washer 20 is further provided with a plurality of depressions, seats or apertures 22 arranged in an annular row adjacent the outer margin of the washer and opening to one face at least thereof. The washer 20 is formed with radial lugs 23, 24 on its face opposite to the depressions, seats or apertures 22. It is the function of the radial ribs or lugs 23, 24 to engage and seat in any soft surface such as wood against which the washer 20 bears at one side, or to seat in and lock with depressions which may be formed in any hard object such as a metal fish-plate against which said washer is applied and prevent rotation of said washer. It is the function of the seats, depressions or apertures 22 to engage with the locking lug 18 on the locking spring 16 and hold the nut 10 in any position in which it may be placed manually. The seats, depressions or apertures 22 are formed with inclined walls at one side so that the nut may be rotated in the direction for tightening and the locking lug 18 will ride over said seats until the nut comes to rest; but will engage in said seats and prevent reverse rotation of the nut. When it is desired to rotate the nut reversely a tool is introduced between the free end portion of the spring 16 and the washer 20 to wedge or pry said spring outward and depress it in the groove 12 so as to withdraw the locking lug 18 from engagement with the washer.

The nut may be employed without the washer at times, in which event the locking lug 18 would engage with seats or depressions formed in the object against which the nut is screwed, or if such object be of wood or other soft material said lug would be set into the face thereof by blows or pressure applied to the hook 19.

I claim as my invention—

1. A locking nut formed with an inclined groove extending across the bottom and a connecting groove extending across one face, a spring mounted in said grooves, one end of said spring being fixed to said nut, one of said grooves formed with a shoulder, said spring formed with a hook adapted to engage said shoulder at times, and a locking lug formed on and projecting from said spring intermediate of its ends, the locking lug only projecting outside the grooves.

2. A locking nut formed with an inclined groove across its bottom and a connecting groove in one face, a spring wholly mounted within and adapted for movement in said grooves, one end of said spring being fixed to said nut, and a locking lug formed on said spring and projecting at times outside of a groove, the combined thickness of the lug and spring being greater than that of the spring alone.

3. A locking nut formed with an inclined groove in one end and connecting grooves in opposite faces, a spring mounted in said grooves, one end of said spring being fixed to said nut, one of said grooves formed with a shoulder, said spring formed with a hook adapted to engage said shoulder at times, and a locking lug formed on and projecting from said spring intermediate of its ends.

4. A locking nut formed with an inclined groove across its bottom and a connecting groove in one face, a spring wholly mounted within and adapted for movement in said grooves, one end of said spring being fixed to said nut, and a locking lug formed on said spring and projecting at times outside of a groove, the combined thickness of the lug and spring being greater than that of the spring alone, in combination with a washer formed with seats or depressions adapted to engage and limit movement of said lug.

5. A locking nut formed with an inclined groove in one end and connecting grooves in opposite faces, a spring mounted in said grooves, one end of said spring being fixed to said nut, one of said grooves formed with a shoulder, said spring formed with a hook adapted to engage said shoulder at times, and a locking lug formed on and projecting from said spring intermediate of its ends, in combination with a washer formed with seats or depressions adapted to engage and limit movement of said lug.

6. A locking nut formed with an inclined groove across its bottom and a connecting groove in one face, a spring wholly mounted within and adapted for movement in said grooves, one end of said spring being fixed to said nut, and a locking lug formed on said spring and projecting at times outside of a groove, the combined thickness of the lug and spring being greater than that of the spring alone, in combination with a washer formed with seats or depressions adapted to engage and limit movement of said lug, and engaging means on said washer adapted to engage a seat in a surface against which said washer bears at one side and prevent rotation of said washer.

7. A locking nut formed with an inclined groove in one end and connecting grooves in opposite faces, a spring mounted in said grooves, one end of said spring being fixed to said nut, one of said grooves formed with a shoulder, said spring formed with a hook adapted to engage said shoulder at times, and a locking lug formed on and projecting from said spring intermediate of its ends, in combination with a washer formed with seats or depressions adapted to engage and limit movement of said lug, said washer formed with radial lugs on one face.

Signed by me at Des Moines, Iowa, this fifth day of September, 1910.

ISAAC FRANKLIN NICHOLS.

Witnesses:
S. C. SWEET,
EARL M. SINCLAIR.

---

Copies of this patent may be obtained for five cents each, by addressing the "Commissioner of Patents, Washington, D. C."